C. W. SMITH.
MACHINE FOR PICKING FEATHERS FROM FOWLS.
APPLICATION FILED FEB. 11, 1911.
1,006,304.                                         Patented Oct. 17, 1911.
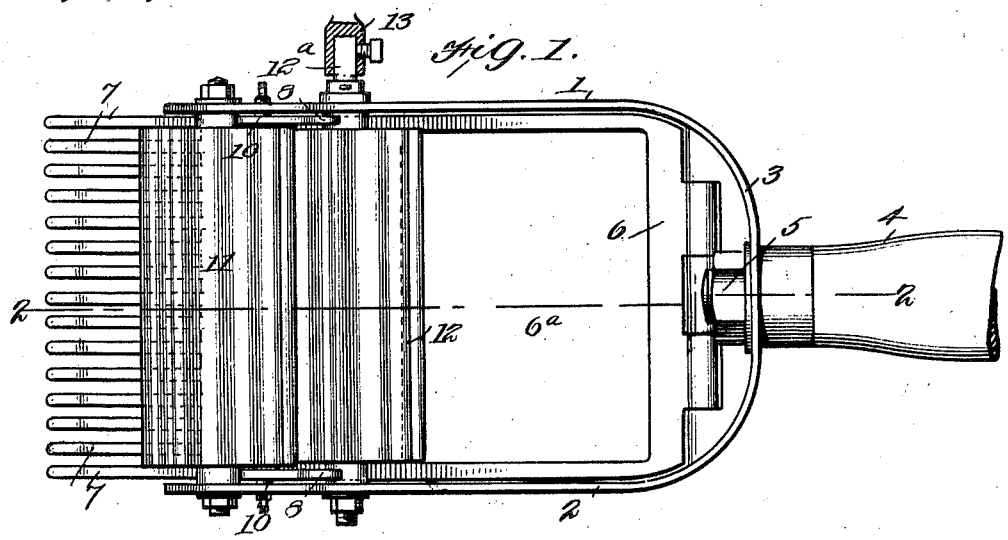
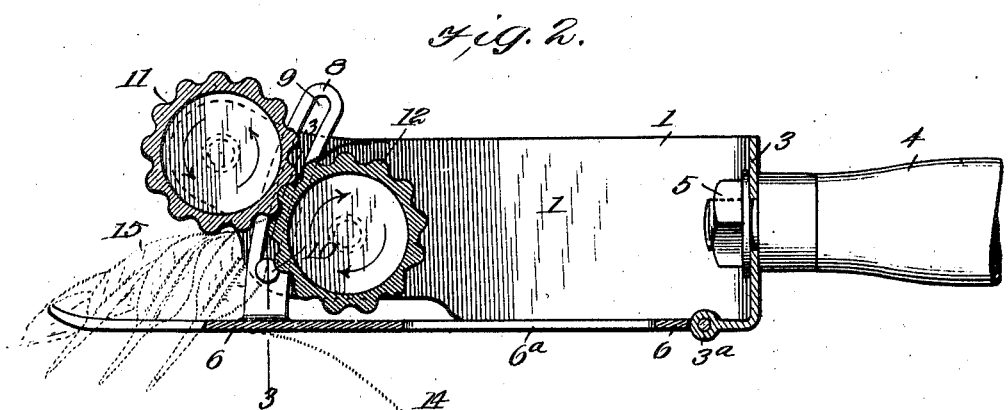
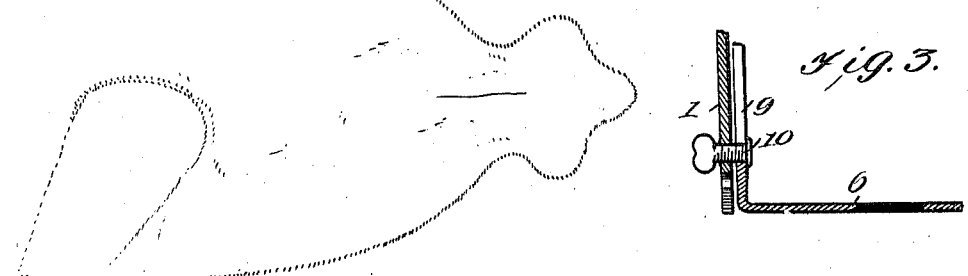
WITNESSES:
H. C. Barry
L. A. Stanley
INVENTOR
CHARLES W. SMITH
BY Munn & Co.
ATTORNEYS

UNITED STATES PATENT OFFICE.

CHARLES W. SMITH, OF BERLIN, WISCONSIN.

MACHINE FOR PICKING FEATHERS FROM FOWLS.

1,006,304.          Specification of Letters Patent.          Patented Oct. 17, 1911.

Application filed February 11, 1911. Serial No. 608,100.

*To all whom it may concern:*

Be it known that I, CHARLES W. SMITH, a citizen of the United States, and a resident of Berlin, in the county of Green Lake and State of Wisconsin, have made certain new and useful Improvements in Machines for Picking Feathers from Fowls, of which the following is a specification.

My invention relates to devices for picking feathers from fowls, more particularly for picking feathers from poultry, and it consists in the combinations, constructions, and arrangements herein described and claimed.

An object of my invention is to provide a device by means of which the feathers may be removed from poultry in a much less time than in the ordinary manual operation.

A further object of my invention is to provide a machine for picking feathers which will effectively accomplish the operation without injury to skin of the fowl.

A further object of my invention is to provide a device for accomplishing the above named objects, which has few parts, is simple in operation, and is therefore not liable to get out of order.

Other objects and advantages will appear in the following specification, and the novel features of the device will be particularly pointed out in the appended claims.

My invention is illustrated in the accompanying drawing forming part of this application in which, Figure 1 is a plan view of the device, Fig. 2 is a section along the line 2—2 of Fig. 1, and Fig. 3 is a section along the line 3—3 of Fig. 2.

In carrying out my invention I provide a U-shaped frame consisting of the sides 1 and 2 and the back 3. To the back is secured an operating handle 4 by means of a nut 5. The back 3 is bent forwardly at its lower edge to form the pivotal support $3^a$ for a movable bottom member 6. The latter has a central opening $6^a$ for a purpose hereinafter described, and is provided at its forward edge with a series of teeth 7 which constitute, in fact, a comb. On each side of the bottom member 6 is an arc-shaped arm 8, which is provided with a slot 9 through which projects a pin 10 carried by the side wall.

Disposed within the U-shaped arms 1 and 2 are the fluted or corrugated rollers 11 and 12 respectively. The former is mounted for revolution within the arms and the latter is provided with a shaft $12^a$ which extends through the frame member 1 and is arranged to be attached to a flexible connection 13 connected with a motor (not shown). The two rollers 11 and 12 are arranged to mesh with each other, and the roller 12 is designed to drive the roller 11.

From the foregoing description of the various parts of the device, the operation thereof may be readily understood. The machine is used in a similar manner to power driven horse clippers. The flexible member 13 in rotating drives the roller 12 which, in turn, communicates its motion to the roller 11. The bottom 6 is adjusted toward or away from the rollers 11 and 12 by loosening the set screws 10 and placing the bottom at the proper position, and then tightening the set screws securely. For fowls of one size the bottom would be adjusted farther from the rollers, while for fowls of another size it would be adjusted nearer. The device is held by the handle 4 and the comb is run along the body of the fowl 14 and underneath the feathers 15. The handle is now pushed forwardly and the rollers 11 and 12 catch the ends of the feathers and pull them outwardly, the feathers passing between the rollers 11 and 12, over the roller 12 and through the opening $6^a$ in the bottom member 6. The comb holds the flesh of the fowl firmly in place and does not permit it to be stretched or torn. By working the instrument along the body of the fowl the feathers may be rapidly removed.

I claim:—

1. In a device for plucking feathers from fowls, a comb adapted to be thrust under the feathers, and a pair of intermeshing rollers disposed above the comb in close proximity thereto for frictionally engaging the feathers whereby the latter are pulled through the comb.

2. In a device for plucking feathers from fowls, a comb adapted to be thrust under the feathers, and a pair of fluted intermeshing rollers disposed above the comb in close proximity thereto for frictionally engaging the feathers and pulling them through the comb, one of said rollers serving as a driving means for the other roller.

3. In a device for plucking feathers from fowls, a pivoted comb adapted to be thrust under the feathers, a pair of fluted intermeshing rollers disposed above the pivoted comb in close proximity thereto for frictionally engaging the feathers and pulling them through the pivoted comb, one of said rollers serving as a driving means for the other roller, and means for guiding the movement of the comb relative to the rollers.

4. In a device for plucking feathers from fowls, a frame, a pair of fluted rollers mounted for rotation in said frame, one of said rollers serving as a driving means for the other roller, a comb pivoted to said frame at the front of said rollers, a pair of slotted guide arms secured to said comb, and set screws carried by the frame and arranged to extend through the slots in said guide arm for adjustably securing the bottom at varying distances from said rollers.

CHARLES W. SMITH.

Witnesses:
DONALD U. GREEN,
RALPH K. HOOVER.